US008710399B2

(12) United States Patent
Bednarek

(10) Patent No.: US 8,710,399 B2
(45) Date of Patent: Apr. 29, 2014

(54) DEVICE FOR PRODUCING A CONNECTION GRID WITH AN INTEGRATED FUSE

(75) Inventor: Alain Bednarek, Neuilly en Vexin (FR)

(73) Assignee: Tyco Electronics France SAS, Pontoise (FR)

( * ) Notice: Subject to any disclaimer, the term of this patent is extended or adjusted under 35 U.S.C. 154(b) by 887 days.

(21) Appl. No.: 12/242,073

(22) Filed: Sep. 30, 2008

(65) Prior Publication Data

US 2009/0025209 A1 Jan. 29, 2009

Related U.S. Application Data

(62) Division of application No. 11/066,914, filed on Feb. 25, 2005, now Pat. No. 7,453,345.

(30) Foreign Application Priority Data

Feb. 27, 2004 (FR) ...................................... 04 02037

(51) Int. Cl.
*B23K 26/24* (2014.01)

(52) U.S. Cl.
USPC ..................... 219/121.64; 219/75; 219/137.2; 29/623; 29/756

(58) Field of Classification Search
USPC ............. 219/121.78–121.83, 121.64–121.66, 219/137 R; 29/840–842, 850, 729, 720, 625, 29/628, 33 R; 228/33, 182, 2.1, 44.3; 372/38.02
See application file for complete search history.

(56) References Cited

U.S. PATENT DOCUMENTS

| | | | | |
|---|---|---|---|---|
| 2,055,006 | A | 9/1936 | Dowler | |
| 3,202,788 | A | 8/1965 | George | |
| 3,229,066 | A | 1/1966 | Rowe | |
| 3,444,502 | A | 5/1969 | Matthews | |
| 3,486,154 | A | 12/1969 | Seagrave et al. | |
| 3,813,626 | A | 5/1974 | Cetola et al. | |
| 4,031,612 | A * | 6/1977 | Nicolas | 29/850 |
| 4,110,590 | A * | 8/1978 | Batey et al. | 219/75 |
| 4,203,200 | A | 5/1980 | Wiebe | |
| 4,437,603 | A * | 3/1984 | Kobayashi et al. | 228/4.5 |
| 4,773,157 | A | 9/1988 | Galloway et al. | |
| 4,857,696 | A * | 8/1989 | Taeusch et al. | 219/121.7 |
| 4,872,262 | A | 10/1989 | Marach | |
| 4,894,633 | A | 1/1990 | Holtfreter | |
| 4,983,797 | A * | 1/1991 | McAllister et al. | 219/121.64 |
| 5,011,067 | A | 4/1991 | Foisy | |

(Continued)

FOREIGN PATENT DOCUMENTS

| | | | |
|---|---|---|---|
| EP | 0164799 | A2 | 12/1985 |
| EP | 10208607 | | 8/1998 |
| WO | 03/079390 | A1 | 9/2003 |

*Primary Examiner* — Minh Trinh
(74) *Attorney, Agent, or Firm* — Barley Snyder

(57) ABSTRACT

The invention provides a device for producing a connection grid with an integrated fuse. The device includes a means for supporting the connection grid, a laser head, and a nozzle for supplying fuse wire. The means for supporting the connection grid is a support having a housing that is suitable for receiving a portion of the fuse in the space formed between two symmetrical arms of the connection grid. The support having an overall shape of a hollow half-cylinder, by a curved base and two lateral ribs standing on the base, and an upper surface of which is turned down by chamfering of the housing side. The laser head and nozzle are mechanically connected to a system of robotized shafts.

4 Claims, 4 Drawing Sheets

(56) References Cited

U.S. PATENT DOCUMENTS

| | | | | | |
|---|---|---|---|---|---|
| 5,082,452 | A | | 1/1992 | Takano | |
| 5,122,635 | A | * | 6/1992 | Knodler et al. | 219/121.63 |
| 5,201,453 | A | * | 4/1993 | Amador et al. | 228/110.1 |
| 5,295,619 | A | * | 3/1994 | Takahashi et al. | 228/180.5 |
| 5,958,261 | A | * | 9/1999 | Offer et al. | 219/75 |
| 6,034,343 | A | * | 3/2000 | Hashimoto et al. | 219/74 |
| 6,153,034 | A | * | 11/2000 | Lipsker | 156/73.1 |
| 6,429,402 | B1 | * | 8/2002 | Dixon et al. | 219/121.63 |
| 6,521,861 | B2 | * | 2/2003 | Jones et al. | 219/121.64 |
| 6,596,964 | B2 | * | 7/2003 | Accou | 219/121.64 |
| 6,844,521 | B2 | * | 1/2005 | Staufer et al. | 219/121.63 |
| 6,894,713 | B2 | * | 5/2005 | Moulin et al. | 347/262 |
| 6,940,037 | B1 | * | 9/2005 | Kovacevic et al. | 219/121.64 |
| 7,038,165 | B2 | * | 5/2006 | Okuda et al. | 219/121.78 |
| 7,131,568 | B2 | * | 11/2006 | Ball | 228/180.5 |
| 7,136,723 | B2 | * | 11/2006 | Hirayama et al. | 700/245 |

* cited by examiner

DEVICE FOR PRODUCING A CONNECTION GRID WITH AN INTEGRATED FUSE

CROSS-REFERENCE TO RELATED APPLICATIONS

This application is a divisional application of U.S. patent application Ser. No. 11/066,914, filed Feb. 25, 2005 now U.S. Pat. No. 7,453,345, issued Nov. 18, 2008, which claims priority under 35 U.S.C. §119 to French Application No. 0402037, filed Feb. 27, 2004.

FIELD OF THE INVENTION

The invention relates to fuses and the use thereof on connection grids that are intended, for example, to be used in protective switch boxes for motor vehicles.

BACKGROUND OF THE INVENTION

As is known, a connection grid is a cut-out metal grid that forms the pins of specific component cases and the extension thereof molded into the insulating case, at the end of which a component connection is welded.

Fuses that are suitable for use on connection grids are known, as are methods for connecting these fuses to these connection grids so as to form connection grids with an integrated fuse or fuses.

U.S. Pat. No. 5,011,067 describes, for example, a connection grid comprising a series of projections, each having at its end two strips that are intended to be connected by a fuse.

Strands made of a fusible material are placed transversely to the strips on the connection grid. Each strand comprises two elements that are capable of forming an alloy if sufficient energy is supplied to the strand.

Each strand is then welded to the strips. For this purpose, in the region of each projection, the ends of an energy source are brought into contact at specific points with the fusible material strand to be combined. The energy provided by the energy source allows the elements of the strand to combine, forming a fuse connecting the two strips.

Known fuses integrated into a connection grid require fairly precise and complex assembly, and hence considerable production times resulting in high production costs.

Moreover, these fuses are subjected not only to the current that passes through them, but also to all of the stresses that are exerted in the connection grid and transmitted to them.

A problem of performance is therefore posed, since these fuses are liable to break, not only under the effect of the current that passes through them, but also under the effect of these stresses.

Moreover, the surfaces of contact between these fuses and the ends of the connection grids on which they are mounted are arbitrary, which means that the individual performances are difficult to repeat and limit the latitude available to designers.

SUMMARY

The present invention relates in general to a connection grid allowing a fuse to be fixed to the grid more easily and more quickly, and also resulting in other advantages.

In an exemplary embodiment, the present invention provides a connection grid, comprising at least a pair of arms for fixing a fuse to the grid via its longitudinal ends. Each of the arms comprises a concave portion forming a cradle for receiving one of the longitudinal ends of the fuse.

This results in simpler installation, with the fuse on the correct part of the connection grid, and also in a substantial contact zone allowing optimal connection by welding.

The invention also relates to a method for producing a connection grid with an integrated fuse, characterized in that it comprises a step of forming, on each of the arms of a pair of arms of a connection grid, a concave portion that is suitable as a cradle for receiving one of the longitudinal ends of a fuse, in order to fix the fuse to the grid via these ends.

The invention also relates to a device for implementing this method that comprises means for supporting the connection grid, a laser head and a nozzle for supplying fuse wire, which are preferably mechanically connected to a system of robotized shafts.

BRIEF DESCRIPTION OF THE DRAWINGS

Further characteristics and advantages of the invention will become apparent in the light of the following description, given by way of a non-limiting example, of a preferred embodiment. The description refers to the accompanying drawings, in which.

DETAILED DESCRIPTION OF THE PREFERRED EMBODIMENTS

Figure 1:
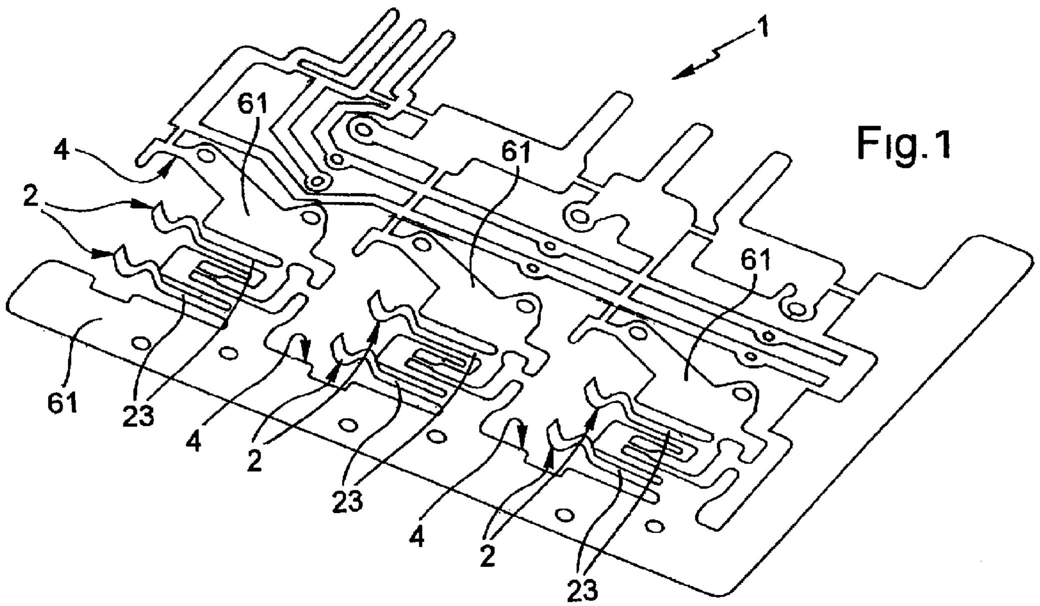
FIG. 1 is a perspective view of a connection grid according to an exemplary embodiment of the invention.

As illustrated in FIG. 1, a metal connection grid 1 according to an exemplary embodiment of the invention comprises three pairs of arms 2, each intended to receive a fuse in the form of a wire made of a fusible material 3 (FIG. 3), and arranged one behind another along one side of the connection grid 1.

In the embodiment described here, the arms 2 are in the form of strips of material and are integral with the rest of the connection grid 1, forming a single piece with the rest of the grid by means of the cutting-out of a metal plate.

The arms 2 of each pair extend parallel to each other and protrude from the rest of the grid 1 into openings 4 formed in this grid 1. They form a plane of symmetry M1, cutting the fuse transversely through its middle and indicated by projected axes in FIG. 3.

Figure 2:
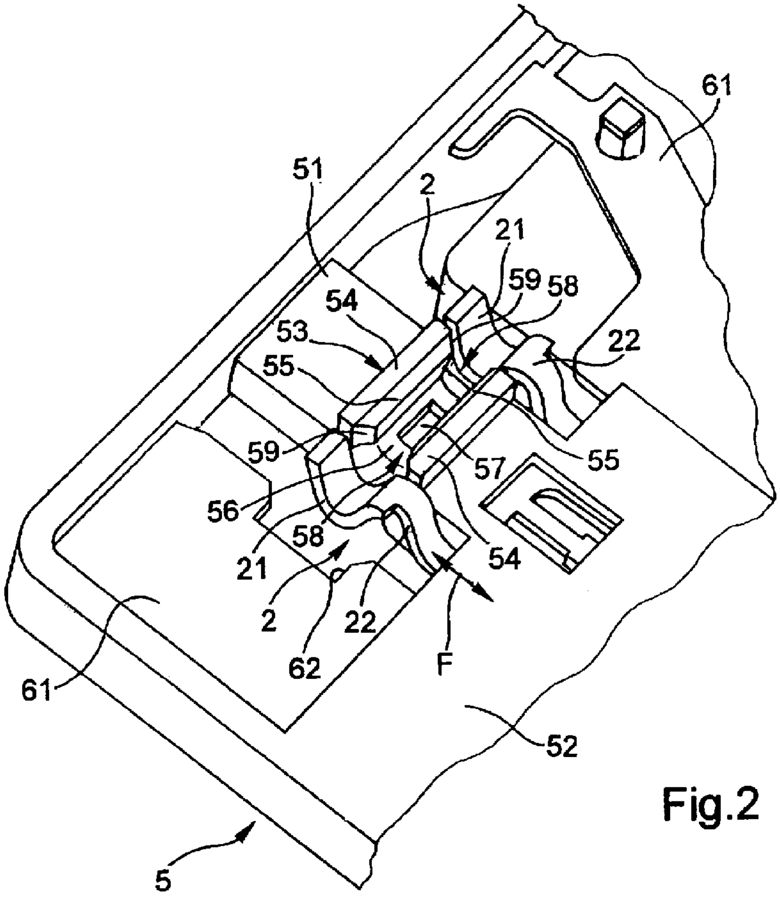
FIG. 2 is a larger-scale perspective view of one end of the grid illustrated in FIG. 1, with a support molded onto this grid.

As is most apparent from FIG. 2, each arm 2 comprises a free end 21, a resilient portion 22 and an attachment portion 23 (FIG. 1).

The free end 21 is concave, being in the shape of a U, the hollow of which is suitable for receiving the fuse 3 and for holding it easily in the correct place.

This free end 21 exhibits a curvature that is suitable for providing a maximum contact surface for effective welding with the fuse 3, in particular without having a detrimental effect on the shape of the fuse 3.

The free end 21 is extended by the resilient portion 22. This portion 22 is in the overall shape of an inverted U, forming with the U-shaped end an S-shape, and its dimensions are such as to allow it resiliently to absorb axial stresses. It is substantially less wide than the free end 21. The arm 2 is thus capable of withstanding axial stresses, as indicated by the double-headed arrow F, when the fuse 3 is subjected to stresses resulting, for example, from the effects of heat on a support 5 of the fuse 3, which will be described in greater detail below.

The resilient portion 22 is extended by the attachment portion 23, the dimensions of which are such as to give the fuse 3 the desired strength. It extends in the same plane as that of the rest of the connection grid 1, whereas the free end 21 and the resilient portion 22 partially protrude therefrom vertically.

Figure 3:
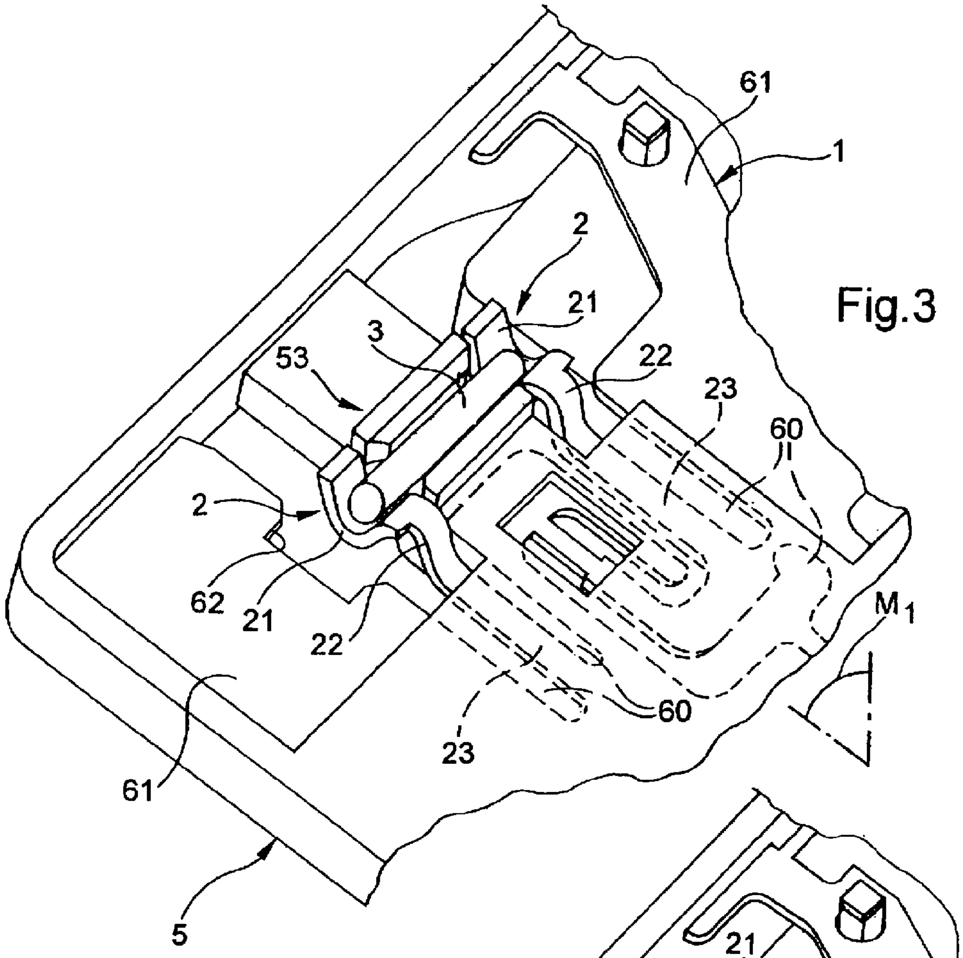
FIG. 3 is a perspective view of the assembly illustrated in FIG. 2, after the addition of a fuse.

As is particularly apparent from FIG. 3, a support 5 made of plastic material is molded onto the connection grid 1.

This support 5 comprises, in the zone of each pair of arms 2, two end portions 51 and 52, which extend transversely beyond the arms 2 on either side of the corresponding free ends 21 and resilient portions 22, and respectively cover a part of the opening 4 and the arms 23. They are formed in a single piece with a central portion 53, which acts as a support for the fuse 3 (FIG. 3) between the two corresponding arms 2.

The central portion 53 is in the overall shape of a hollow half-cylinder formed by two ribs 54 for holding the fuse 3 in place, which ribs project vertically from the end portions 51 and 52, and a curved base 56. These ribs 54 are slightly thicker than the free ends 21 of the arms 2, and have upper surfaces that are turned down on the inner side of the half-cylinder by chamfers 55.

A fuse 3 placed on the upper part of one of the ribs 54 thus tends to fall inside the central portion 53, onto the base 56 thereof.

The base 56 comprises at its center a well 57, parallelepiped in shape and aligned along the axis of the half-cylinder. This recess allows a small amount of material, such as a portion of fusible material melted after shorting of the fuse 3 or a material for preventing the formation of electric arcs during this shorting, to be accommodated.

The two lateral openings of the half-cylinder 58, which are located at the axial ends of the central portion 53, are each provided opposite the hollow of one of the U-shaped free ends 21 of the arms 2.

Moreover, these lateral openings expand outwardly inside the central portion 53, in the manner of a diffuser. For this purpose, broadening sections 59, which increase in width toward the outside of the central portion 53, are cut into the ribs 54. Thus, when the fuse 3 dilates, it is not subjected to any stress and may spread into the space freed by the lateral openings 58 and the broadening sections 59 thereof.

In practice, the support 5 is molded onto the connection grid 1 so as to ensure that the central portion 53 is placed opposite the hollow forming each free end 21, as a result of which this central portion 53 forms for the fuse 3 a cradle that is complementary to that formed by the free ends 21 of the arms 2.

As is most apparent from FIG. 3, the plastics material of the support 5 penetrates the slots 60 in the connection grid 1 in the immediate vicinity of the fuse, promoting optimal adjustment of the expansion coefficient of the grid 1/support 5 sandwich to that of the fuse 3, and reduction of the effects of differential heat stresses thereon.

This sandwich is also constructed so as to limit the mechanical effects of the other components fixed to the connection grid 1 on the fuse 3.

In practice, the fuse 3 is therefore partially decoupled from the part of the connection grid 1 that holds the other components.

In practice, creating a metal and plastics material sandwich allows the real expansion coefficient thereof to be adjusted to that of the fuse 3, by defining the dimensions of each of the layers of this sandwich.

It will also be noted (FIGS. 3 and 4) that the support 5 is fitted to the bus bar 61 of the connection grid 1, which, in practice, holds the arms 2, and in which, in particular, the openings 4 and the slots 60 are formed.

Figure 4:
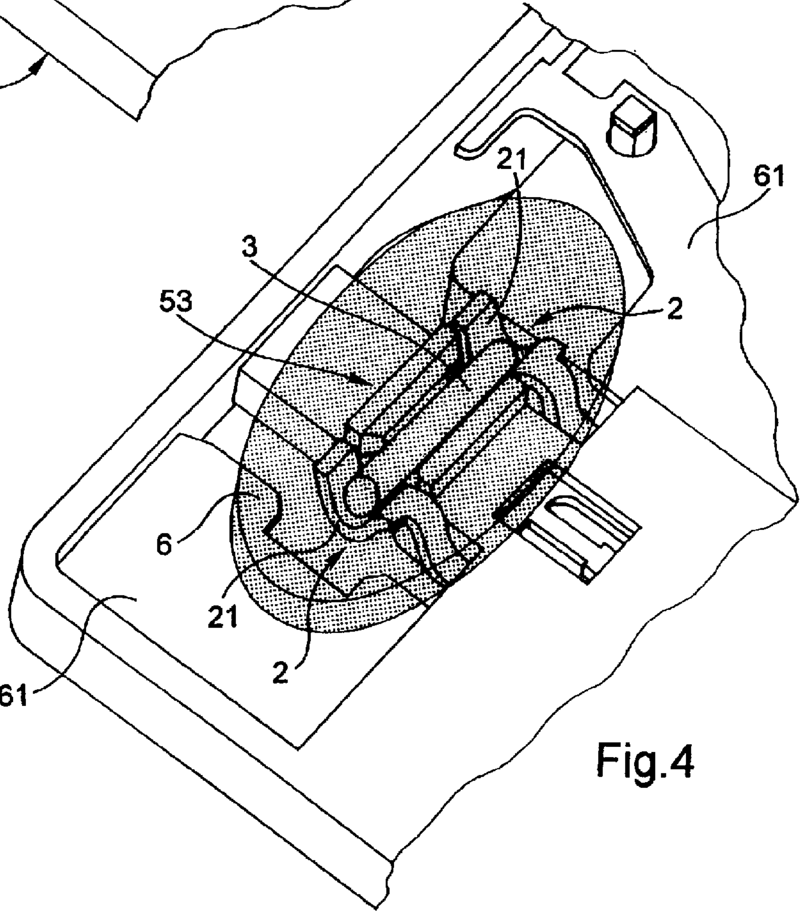
FIG. 4 is a perspective view of the assembly illustrated in FIG. 3, covered with a hot-melt adhesive.

As is apparent from FIG. 4, once the fuse 3 is in place, it is covered with a hot-melt adhesive 6. In practice, when the fuse melts (shorting), the portion of melted fuse may become lodged in the well 57 and the adhesive 6, which melted at the same time as the portion of melted fuse, takes the place thereof.

This adhesive 6 therefore not only allows the fuse 3 to be held in place between the ribs 54, but also ensures that no electric arcs may reach the elements surrounding the fuse when it melts.

Moreover, this adhesive 6 advantageously absorbs any vibration energy and protects the fuse 3 against any ionizable material by filling the gaps surrounding the fuse 3.

The fuse 3 is integrated into a connection grid 1 in the following manner.

The first step consists in obtaining a connection grid 1 comprising arms 2, as described above and produced by a forming process. The connection grid 1 is, in this case, provided with these arms during production. In a variant, the arms are produced independently, then welded to the grid.

The second step consists in molding the support 5 onto the grid 2. This step involves the selection of a suitable material for the support and also the placement thereof relative to the arms such that the central portion, as described above, is located opposite the hollows of the arms 2.

The third step consists in placing and welding the fuse 3 using an entirely automatic method, which will now be described with reference to FIG. 5 to 12.

This method utilizes a nozzle for supplying fusible wire and a laser head for welding, both of which are mechanically connected to a system of automated shafts 90. Moreover, the desired fusible wire length is controlled by means of a step motor and drive roller, and the molded circuit 1, 5 of FIG. 2 is positioned on a support (not illustrated in the figures), which ensures its position relative to the laser head/nozzle for supplying fusible wire pair.

In an exemplary embodiment, the alloy used for the fusible wire is a lead-free alloy, in this case of the SnCu or SnAgCu type. These alloys exhibit, in particular, good hot flow properties.

More generally, any alloy with a low melting point may be used that allows a cold fuse to be obtained, i.e. a fuse of which the melting temperature is sufficiently low that, in the case of slow shorting, the fuse is able to break the circuit before the temperature of the assembly comprising all of the components rises to the extent that it results in the deterioration of these same components.

It will be noted in this regard, that slow shorting is characterized by an intermittent short-circuit with insufficient shorting energy for each short-circuit. As a result, the fuse is not shorted.

The corresponding shorting energy is dissipated toward the assembly of the components and the temperature of the entire system increases until the melting temperature of the fusible alloy is reached. The fuse is then shorted and the circuit turned off or opened.

It is therefore important to select the melting temperature of the fuse carefully. In practice, this melting point is, in this case, selected so as to be less than or equal to 250° C., preferably less than or equal to 232° C. The aforementioned alloys are suitable for temperatures of this type.

In practice, the lower the melting temperature, the more the fuse is what is known as "cold" and the more effectively it protects the other components in the event of slow shorting, but the less effective are its mechanical properties. This is why the expansion of the metal 1/plastics material 5 sandwich must also be controlled and the fusible entity 3 decoupled from the rest of the product.

Before the head and the nozzle are positioned above the circuit, the welding zones (U-shaped concave portions of the circuit 1) are subjected to fluxing and the nozzle for supplying fusible wire is then preheated.

Figure 5:
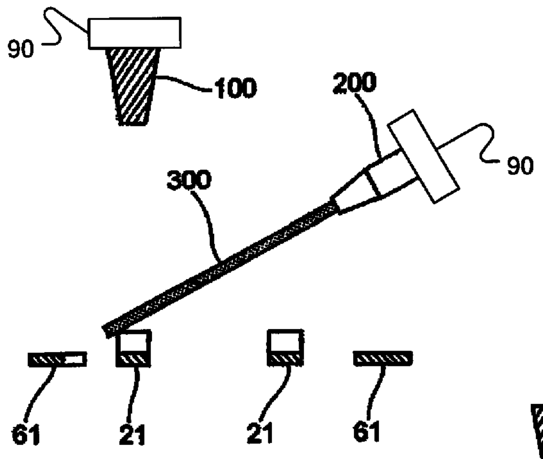
FIG. 5 to 12 are views illustrating the installation and the welding of a fuse onto a grid molded, in order to obtain the assembly of FIG. 3.

As is apparent from FIG. 5, the laser head 100 and the preheated nozzle 200 for supplying fusible wire are positioned above the circuit of FIG. 2, illustrated schematically in FIG. 5 by a cross-section of two U-shaped concave portions 21 that are intended to receive a fuse 3, and of two parts that are adjacent to the bus bar 61 delimiting the opening 4 in which these two concave portions 21 extend.

Figure 6:
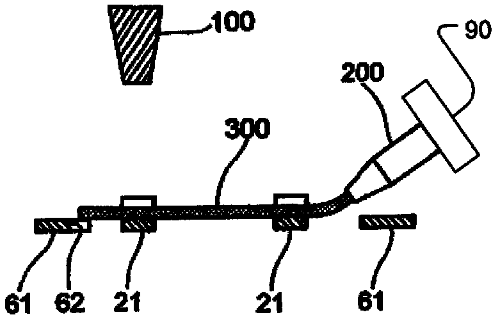
Figure 7:
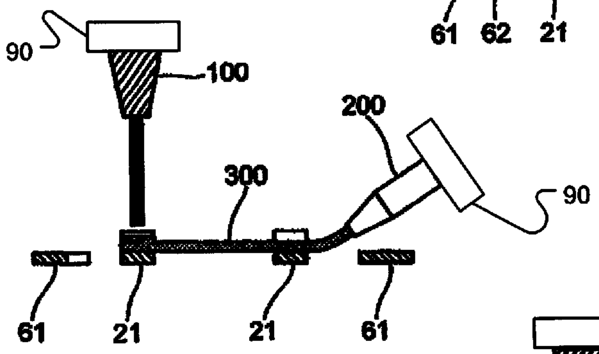

As is apparent from FIG. 5, fusible wire 300, which is intended to form the fuse 3, is then advanced above the connection grid or circuit 1 using the supply nozzle 200, and the head 100/nozzle 200 pair is then lowered in order to place the aforementioned wire 300 into its housings, i.e. the U-shaped concave portions 21 (FIG. 6).

It will be noted, in this regard, that the wire 300 projects beyond each side of the concave portions 21:

on the left side, in order to have a reserve of fusible material, which will fill the welding zone by capillary action during the fusion. This justifies the projection 62 into the bus bar 61 on the side thereof that is adjacent to the portion 21, which firstly receives the fusible wire 300, and this prevents thermal contact between the wire and the circuit. If thermal contact did take place, the welding energy would emanate by conduction into the circuit and the quality of the weld would be unstable; and on the right side, by virtue of the method used.

Laser welding is then carried out (FIG. 7), using the laser head 100, in the U-shaped concave portion 21, having firstly received some fusible wire 300. The use of the laser causes fusion of the material to be welded and the soldering wire fills the mould by means of capillary action.

Figure 8:
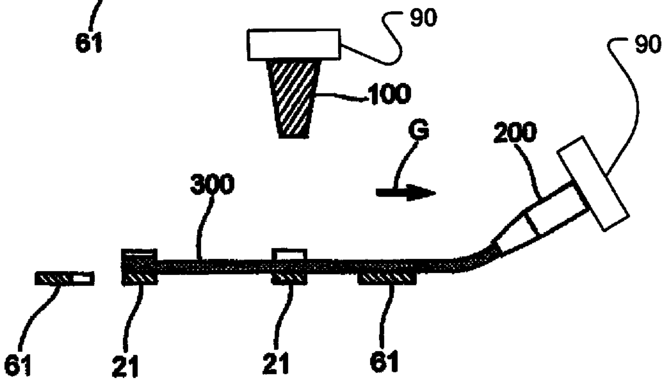
Figure 9:
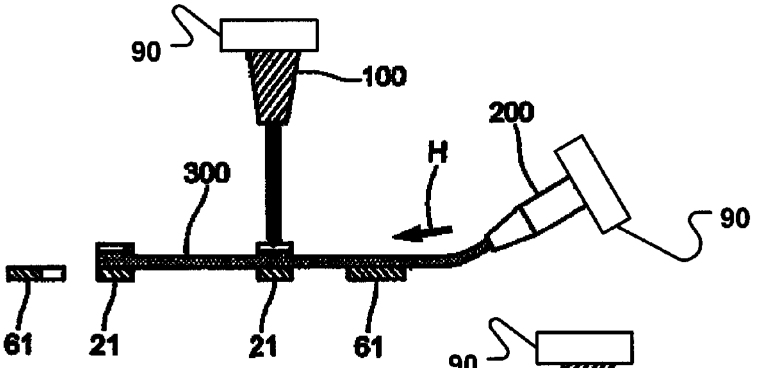
Figure 10:
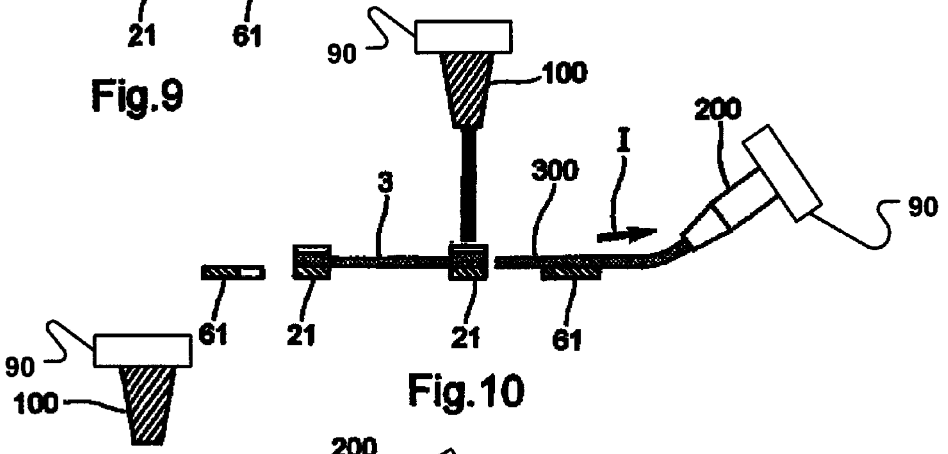

The laser is then cut and the laser head 100/supply nozzle 200 pair displaced, with simultaneous unwinding of the fusible wire 300 beyond the inner part of the bus bar 61 (arrow G in FIG. 8).

The laser welding of the second point (second concave portion 21 located on the inner side of the connection grid 1 relative to the concave portion 21, having firstly received some fusible wire 300) is then carried out.

During the welding process, once the fusion of the alloy has been attained, there is also a controlled complementary supply of fusible wire 300 (arrow H in FIG. 9) in order to fill the welding zone.

The fusible wire 300 is then extracted (arrow I in FIG. 10) by withdrawing the supply nozzle 200, in order to separate the fusible wire 300 from the welding zone. It will be noted, in this regard, that the laser is still activated.

Figure 11:
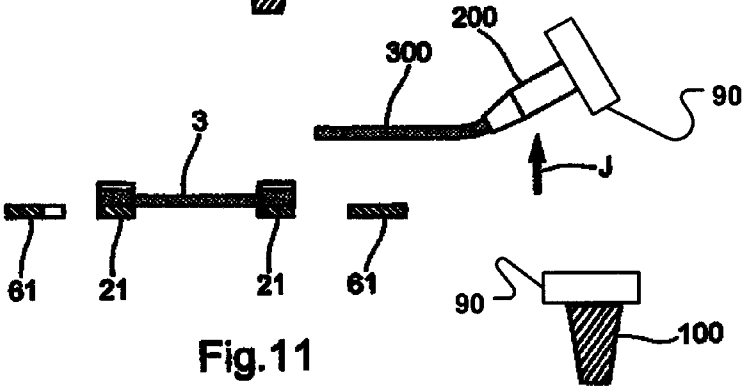
Figure 12:
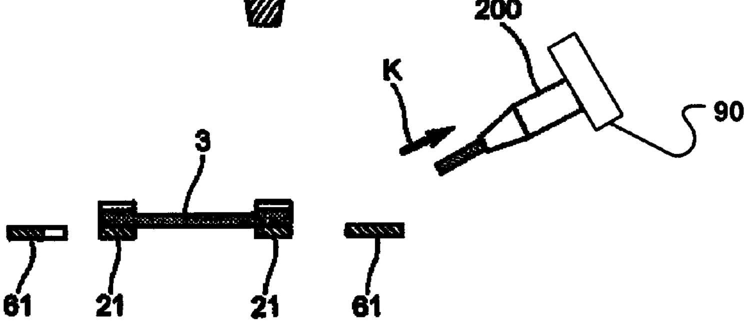

The laser shot is then stopped and the laser head 100/supply nozzle 200 pair raised (arrow J in FIG. 11).

Finally, the fusible wire 300 is withdrawn into the supply nozzle 200 (arrow K in FIG. 12), while the fusible wire is hot, to straighten the bend that formed previously in the fusible wire 300, in order to produce the fuse. It will be understood that the use of a laser source allows optimal control of the welding zone that is thermally affected, by modifying as little as possible the metallurgic structure of the fuse in each of the two welding zones that are thermally affected.

In practice, this automatic process and the S-shape that receives the fusible wire make it conceivable to weld a plurality of fusible wires, one beside another, and consequently to produce different shorting ranges, as desired.

Finally, the last step consists in covering the assembly formed in the fourth step with an adhesive 6. As indicated above, this is a hot-melt adhesive, which penetrates the open zones of the central portion 53, promoting optimum sealing of the fuse 3.

The invention is not limited to the embodiment described above.

In particular, fuses requiring different wires, exhibiting varying melting points, may be envisaged. Similarly, the arms may be made of various materials and may, for example, be printed circuits.

A support that is not molded onto the grid, but produced separately and gauged for optimal interaction, is also conceivable.

What is claimed is:

1. A device for producing a connection grid with an integrated fuse, comprising:

a support supporting the connection grid;
a laser head;
nozzle preheated for supplying fuse wire; and
at least two robotized shafts;
wherein the laser head and nozzle are mechanically connected to the at least two robotized shafts, the nozzle movable by one of the at least two robotized shafts to position the fuse wire.

2. The device according to claim 1, further comprising means for controlling the fuse wire length.

3. The device according to claim 1, wherein the preheated nozzle independently moveable from the laser head by the at least two robotized shafts.

4. A device for producing a connection grid with an integrated fuse, comprising:

a support having a housing positioned to receive a portion of the fuse in a space formed between two symmetrical arms of the connection grid;
a laser head; and
nozzle for supplying fuse wire and preheated, the laser head and nozzle being mechanically connected to at least two robotized shafts and independently moveable from each other.

* * * * *